Sept. 13, 1938.  L. B. BACON  2,129,984
DRUM TYPE INDICATOR
Original Filed Dec. 17, 1930    3 Sheets—Sheet 1

Inventor:
Leonard Bernard Bacon
Per Hubert J. E. Peck
Atty.

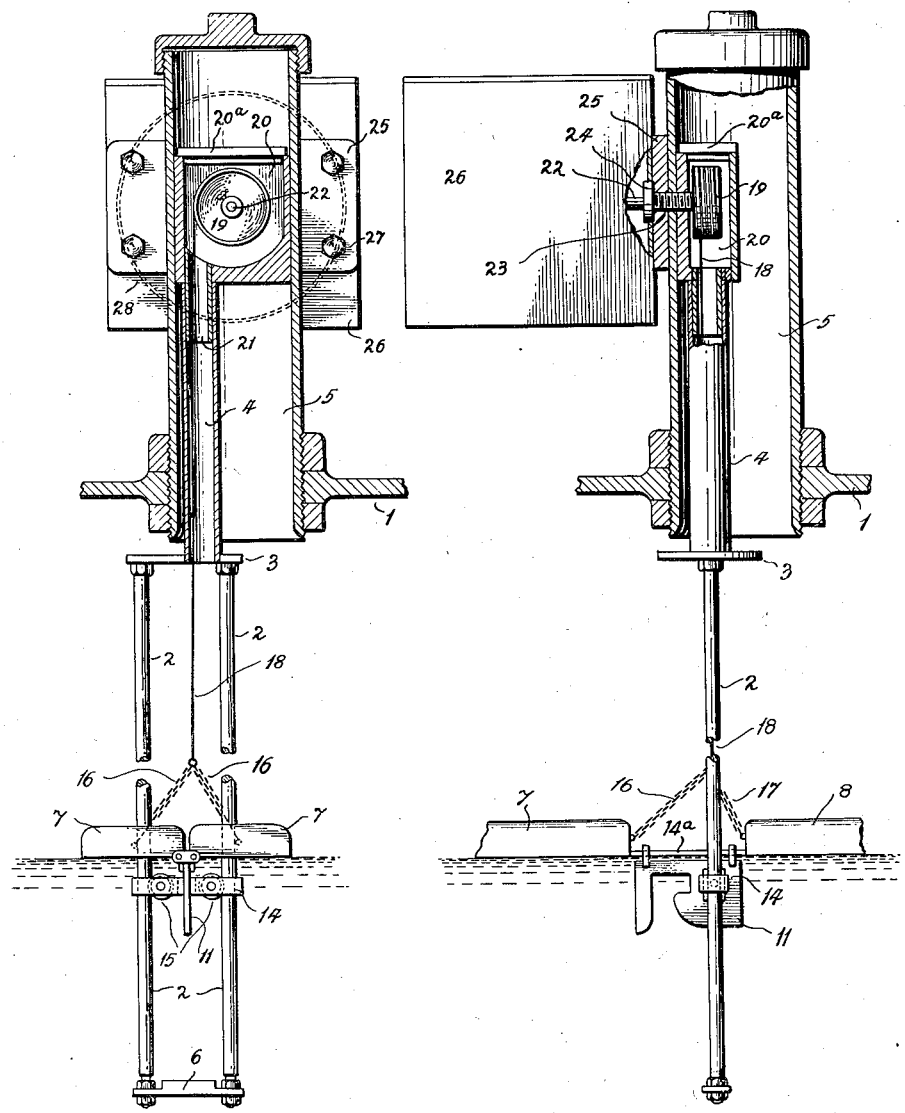

Sept. 13, 1938.　　　　　L. B. BACON　　　　　2,129,984
DRUM TYPE INDICATOR
Original Filed Dec. 17, 1930　　3 Sheets—Sheet 3
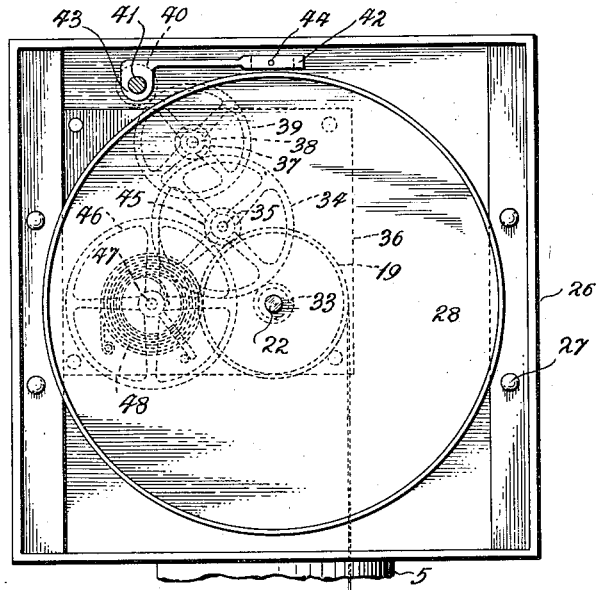
Fig. 4
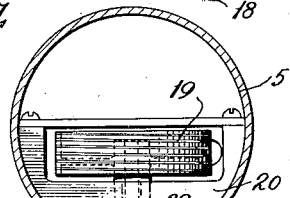
Fig. 5
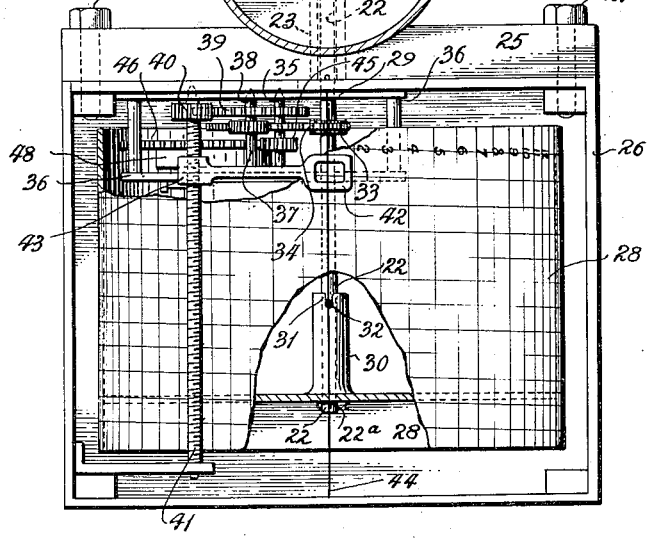
Inventor:
Leonard Bernard Bacon
Per Hubert Peck
Atty Patented Sept. 13, 1938

2,129,984

UNITED STATES PATENT OFFICE 2,129,984

DRUM TYPE INDICATOR

Leonard Bernard Bacon, East Brunswick, Australia

Original application December 17, 1930, Serial No. 503,080. Patent No. 2,054,212, dated September 15, 1936. Divided and this application August 15, 1936, Serial No. 96,299. In Australia September 9, 1930

9 Claims. (Cl. 116—118)

This application is a division of my application "Liquid level indicator" filed Dec. 17, 1930, Ser. No. 503,080, and now issued as Letters Patent 2,054,212, Sept. 15, 1936.

This invention relates to a liquid level indicator and has been devised with the object of providing a simple and reliable device which will indicate the quantity of petrol or liquid pumped or drawn at intervals from such as a petrol storage tank or other reservoir or container.

This invention also enables the person in charge of such as a petrol service station to know reasonably accurately what quantities of petrol or oil are being sold and also the quantity remaining in the petrol tank.

The main feature of this invention resides in the fact that the measurements of the petrol or liquid displacement in the tank are accurate and depend upon the principle of petrol or liquid level governing the descension of a float and whereby the effect of the movement of the float is greatly augmented or increased by means which will be hereinafter described.

A defect in apparatus such as is usually employed is that it results in a reduced movement of a pointer or the like, whereas in my invention even when a very small quantity of liquid is removed from the tank the displacement of the float due to the receding level of the liquid can be increased or multiplied, and in this instance by increasing the diameter of a calibrated drum from which the readings are taken. Briefly, this invention consists of employing a hollow collapsible metal float which rides upon the surface of the liquid within the tank and its suspended from a fine metal wire which is attached to a grooved pulley. This pulley is mounted upon the inner end of a spring controlled shaft which also carries a drum on the cylindrical surface of which is a calibrated spiral. A spur pinion is mounted upon said shaft which pinion when the float is descending drives a gear train which both rotates a horizontally disposed screw and winds up a spring. Mounted upon said screw is a movable mask which is positioned on the top of or aside of the calibrated drum. The said screw which is restrained against longitudinal movement revolves in unison with the said drum spiral so that the mask is always opposite to the correct part of the spiral and cannot get out of register with such. Thus when a number denoting such as gallons or other quantities is brought under the mask a reading can be quickly and easily taken.

A further feature of this invention relates to the automatic coiling of the float suspension spring upon its pulley when the tank is empty and needs replenishing with petrol or other liquid. This is accomplished by means of the aforesaid gear train which winds up the spring when the float is descending, but when the float has stopped in its descent the spring begins to unwind and reverses the rotary movement of the drum shaft through the intervention of the said gear train, and the rotating pulley on said shaft winds the suspension wire upon itself. Also the said expanding spring reverses the rotary movement of the said restrained screw and the mask travels in the reverse direction along the screw till it reaches the zero mark on the drum which has likewise rotated.

Referring to the drawings—

Fig. 2 is a side elevation in part section, and

Fig. 3 is a front part sectional elevation of the device.

Fig. 4 is an end elevation of the indicator drum showing the gear train therein and Fig. 5 is a sectional top plan of the indicator and its supporting tube, disclosed by Figs. 1 and 4, the indicator drum being partially broken away to show otherwise hidden parts, dotted lines indicating other hidden parts.

Figure 1:
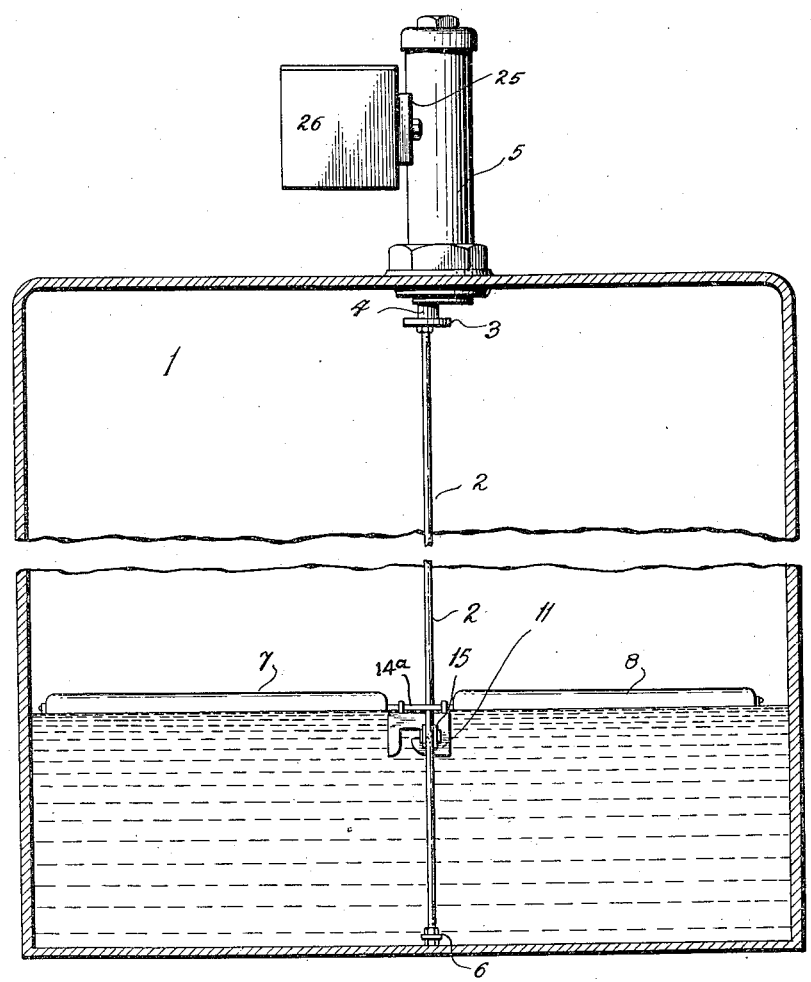
Fig. 1 is a front elevation of the device as applied to a petrol storage tank.

In the said drawings the reference numeral 1 indicates a petrol storage tank which may be of the usual holding capacity of say 500 gallons. 2 denotes a pair of vertically disposed guide rods the upper end of which are threaded for engagement with tapped holes in a hollow plate or flange 3 mounted upon the end of a depending guide pipe 4.

The said pipe 4 is housed in the dip tube 5 and aside of the center thereof to leave a comparatively large space or area for the removal of a dip stick therethrough. The lower ends of the said guide rods are secured to a cross bar 6 as illustrated.

The numerals 7—8 represent a collapsible float, one part 7 of said float being longer than the other in order that its additional weight will make it tilt downwards from the normal and horizontal position to the vertical so that the whole float can be drawn up and through the dip tube 5 should the float leak or have to be repaired.

14 represents a pair of brackets supported upon the ends of a pin 14ᵃ upon which pin a tipping plate 11 is free to pivot. 15 is a pair of pulleys supported in the said brackets. 16 represent a pair of chains attached at their lower ends to the two float sections 7, and 17 are a pair of chains similarly connected at their lower ends to the float section 8.

The upper end of the said chains 16, 17 are attached to a suspension wire 18 preferably made of spring steel, which passes up through the pipe 4 and through an inner and concentrically mounted tube 21 into a pulley housing 20 and is then connected to a grooved pulley 19. The tube 21 is secured to and depends from the housing 20 and acts as a support for the upper end of the guide pipe 4.

The said pulley housing 21 is open at one side and its open top is closed by a removable cap 20ᵃ and extends across one half of the dip tube as shown in Fig. 5. The pulley 19 is mounted on the inner end of a horizontal drum shaft 22 which passes freely through a hollow screw 23, the outer end of which is formed with a collar 24 to enable said screw to be conveniently screwed into and unscrewed from an internally threaded bore formed in the pulley housing 20, the dip tube 5 and a plate 25 which by means of set screws 27 is secured to and supports a drum box 26 which latter houses a calibrated drum 28.

The drum shaft 22 is suitably supported in a bearing 29 and the drum 28 is furnished with a sleeve 30 formed with a recess 31 for engagement by a pin 32 carried in the shaft 22, the drum being retained in position upon the said shaft by means of a split pin 22ᵃ. Upon the said drum shaft is mounted a spur pinion 33 which meshes with a spur wheel 34 mounted upon a shaft 35 supported in bearings in a gear casing 36. The spur wheel 34 meshes in turn with a spur pinion 37 mounted upon a shaft 38 which also carries a spur wheel 39 which gears with a pinion 40 mounted on the outer end of a rotary, preferably, short-pitch screw 41. 42 is a mask the inner end of which is formed into a nut 43 which is in constant operative mesh with and travels in either direction along the screw and the latter revolves in unison with the drum spiral.

A piece of fine wire 44 is secured to the ends of the drum box and passes through the said mask and through the longitudinal center thereof, and thereby restrains the mask and nut against angular movements on screw 41 as an axis as the mask slides on and longitudinally of the wire. A spiral curve is marked or traced upon the surface of the drum and which spiral carries a series of equidistantly spaced numerals each of which denote some quantity such as a number of gallons or the like, depending upon the nature of the contents in the tank. In measuring such as petrol or oil the numerals would denote gallons. The mask and the drum are so arranged in relation to each other that when a particular numeral is brought directly under the mask and under the fine wire 44 this numeral indicates the quantity of petrol or liquid which has been removed from the tank.

The descension of the float 7—8 is employed to wind up a spring 48 as follows. Upon the shaft 35 a spur pinion 45 is mounted which meshes with a gear wheel 46 freely mounted upon a rigid or immovable shaft 47 supported in the said gear casing 36. One end of the spring is attached to the gear wheel 46 and the other end of the spring is suitably anchored to the said gear casing. The said spring is wound up when the drum shaft 22 rotates due to the descension of the float and the unwinding of the suspension wire from the pulley 19.

When the tank is being replenished with petrol or liquid the suspension wire 18 becomes slack and the spring 48 then uncoils and reverses the rotary movement of the drum shaft 22 and thus winds the suspension wire on the pulley 19 the unwinding and winding of the wire 18 from and onto the pulley being repeated as the petrol or liquid is removed from and is being replenished in the tank.

In order to remove the float 7—8 out of the tank and through the dip tube 5, the set screws are unscrewed from the drum box 26, and the pulley 19 is removed from the shaft 22. Also the hollow screw 23 is removed from its threaded bore thus permitting the pulley housing 20 with the pulley 19 therein to be raised out of the dip-tube and also the float as will be clear by reference to my Patent 2,054,212 of which this application is a division.

It will be understood that the smallest float movement will cause rotary movement of the calibrated drum and that a reading can easily be taken which is of especial use in such as motor service stations.

It will also be understood that one of the main features of this invention is the use of a calibrated spiral curve upon the cylindrical surface of the drum, and this is a great advance compared to the method of marking a series of numbers or calibrations upon a closed or circumferential curve which limits the readings to one rotation of the drum, whereas by employing a spiral curve the whole surface of the drum can be utilized, that is the readings can be taken from end to end of the drum, and if the drum is of considerable length, numerous readings can be taken.

In the device illustrated the drum is about four inches in diameter and approximately four inches in length, and this has been found sufficient to give readings when employed in conjunction with a tank or receptacle containing approximately 500 gallons of petrol or liquid.

The drum shaft being controlled by a spring ensures that same will have a steady and uniform rotary movement and that the wire supporting the float will always be kept at a tension, and consequently never becomes slack, especially as the pulley 19 is threaded or grooved in the form of a thread or spiral thus ensuring that the wire will always be retained in said thread.

The principle of employing a calibrated spiral on a drum can be used in tanks or containers without dip tubes and where there is a large enough opening to extract an ordinary float.

By increasing the diameter of the drum more exact readings can be taken and the diameter of said drum may be of any length suitable for a particular purpose.

I claim:—

1. A liquid level indicating device, comprising an actuating rotary member; an indicating drum mounted for rotation in either direction and actuated in one direction by said rotary member, said drum provided with indicating indicia spirally arranged circumferentially and longitudinally thereof; a rotary screw arranged longitudinally and exteriorly of said drum and mounted for rotation in either direction; an indicator arranged exteriorly of said drum circumference and operatively associated with said screw for movement in either direction longitudinally of said drum circumference for visible association with said drum indicia; gearing operatively connecting said drum and said screw for causing simultaneous rotation of the drum and screw; and spring means operatively associated with said gearing and wound up thereby when said drum is rotated by said rotary member, said gearing drum, screw and member being simultaneously rotated in the reverse direction by the unwinding of said spring means.

2. In a liquid level indicator, in combination, an actuating rotary member and its shaft mounted for rotation in either direction; an indicating drum carried and rotatable in either direction by said shaft and having a circumferential spirally arranged series of indicia extending longitudinally thereof; a gear train driven by said member in one direction; a spring wound by the gear train when driven in said direction, said gear train and rotary member driven in the reverse direction by the unwinding of said spring; a rotary short-pitch screw driven by said gear train simultaneously with the drum rotation in either direction; and an indicating finger arranged exteriorly of said drum and moved longitudinally thereof in either direction by said screw for visible association with said drum indicia.

3. An indicating apparatus, including, a rotary member; means for actuating said rotary member in one direction; a rotary indicating drum rotated by said member in said direction, said drum bearing circumferential indicating indicia; a gear train driven by said member; means for driving said gear train and reversing the rotation of said member and said drum comprising a spring, said spring adapted to be wound up by said gear train when driven by said rotary member and adapted to unwind and reverse the direction of rotation of said rotary member and said drum; a rotary screw arranged exteriorly and longitudinally of said drum, and rotated in either direction by said gear train; and a non-rotary nut in constant mesh with said screw and provided with an indicating finger for traveling in either direction longitudinally of said drum and arranged for visible association with said drum indicia.

4. In combination, an indicating drum provided with indicating indicia arranged circumferentially, spirally and longitudinally thereof approximately from one drum end to the other, said drum mounted for rotation in either direction and held against longitudinal movements; a rotary member operatively associated with said drum to rotate therewith in either direction; a rotary screw arranged exteriorly and longitudinally of said dum and geared thereto for simultaneous rotation therewith in either direction; a non-rotary nut in mesh with said screw for longitudinal movement thereby in either direction; an indicating pointer for visible association with said drum indicia and moved longitudinally of said drum in either direction by said nut; and spring means operatively geared to said drum and said screw and wound up by drum rotation in one direction and adapted to unwind and reverse the rotation of said drum, screw and rotary member.

5. In a liquid level indicator, in combination, an indicating drum mounted for rotation in either direction and provided circumferentially with indicating indicia; means for rotating said drum in either direction; a rotary screw arranged longitudinally and exteriorly of said drum and geared thereto and rotated thereby in either direction; a non-rotary nut in mesh with said screw and propelled thereby longitudinally thereof in either direction; a finger projecting laterally from said nut and provided with a mask arranged exteriorly of said drum and moved in either direction by said nut longitudinally of said drum for visible association with said indicia; and a normally-fixed visible indicating line traversing said mask and arranged exteriorly and longitudinally of said drum, said mask being confined to and slidable longitudinally of said line.

6. In a liquid level indicator, in combination, an indicating drum mounted for rotation in either direction and provided circumferentially with indicating indicia; means for rotating said drum in either direction; a rotary screw arranged longitudinally and exteriorly of said drum and geared thereto to rotate therewith in either direction; a non-rotary nut in mesh with said screw and propelled thereby longitudinally thereof in either direction; a finger projecting laterally from said nut and provided with a mask having an opening therein arranged exteriorly of said drum and moved in either direction by said nut longitudinally of said drum for visible association with said indicia; and a normally fixed fine wire extending centrally across the mask opening and arranged longitudinally of the exterior of said drum along the path of movement of said mask and restraining the mask against lateral movements.

7. In a liquid level indicator, in combination; a single rotary drum adapted to be provided with exterior visible circumferential indicia; means for rotating said drum in either direction; a rotary screw arranged exteriorly and longitudinally of said drum and rotated thereby in either direction; a non-rotary nut moved longitudinally in either direction by the appropriate rotation of said screw, an indicator carried by said nut and moved thereby longitudinally of said drum in either direction for operative association with said drum indications; and a visible indicating wire extendng exteriorly and longitudinally of said drum with said indicator threaded thereon and slidable in either direction on and longitudinally of said wire.

8. In a liquid level indicator, in combination, a rotary member adapted to receive exteriorly visible indicia; an indicating mask having an opening therein arranged exteriorly of and in operative visible indicating relation to said member and its indicia, and confined to a straight line path of travel in either direction longitudinally of said member; a normally fixed visible indicating wire traversing the opening of said mask and on which said mask is slidable and by which it is confined to a straight line path of movement; and actuating mechanism for simultaneously rotating said member and propelling said mask on its straight line travel along said fixed wire.

9. In a liquid level indicator, in combination; an indicating drum mounted against endwise movements, to rotate in either direction on its longitudinal axis and provided with circumferential visual indicia; an indicating mask arranged exteriorly of said drum and in cooperative visual relationship to said indicia, and confined to a straight line path of movements longitudinally and exteriorly of said drum; a normally fixed visible indicating wire along which said mask is slidable in either direction along its said straight line path of movements, said wire arranged in visual cooperative relation to said mask and said indications and holding said mask against movement from said straight line path; and an operative transmission between said drum and said mask to simultaneously move in unison with the drum rotating in one direction and the mask correspondingly traveling along its straight line path, and with the mask moving along its straight line path in the opposite direction when the direction of drum rotation is reversed.

LEONARD BERNARD BACON.